United States Patent
Pierce

(10) Patent No.: US 7,110,965 B1
(45) Date of Patent: Sep. 19, 2006

(54) METHOD AND SYSTEM FOR DATA REPOSITORY

(75) Inventor: Perry A. Pierce, Darien, CT (US)

(73) Assignee: Pitney Bowes Inc., Stamford, CT (US)

( * ) Notice: Subject to any disclaimer, the term of this patent is extended or adjusted under 35 U.S.C. 154(b) by 663 days.

(21) Appl. No.: 09/475,912

(22) Filed: Dec. 30, 1999

(51) Int. Cl.
*G06G 30/00* (2006.01)

(52) U.S. Cl. ...................................... 705/26

(58) Field of Classification Search ................ 705/26, 705/27, 28, 37
See application file for complete search history.

(56) References Cited

U.S. PATENT DOCUMENTS 5,845,265 A * 12/1998 Woolston .................. 705/37
5,892,900 A * 4/1999 Ginter et al. ............... 395/186
6,363,357 B1 * 3/2002 Rosenberg et al. ........... 705/26

* cited by examiner

*Primary Examiner*—Jaime E. Zurita
(74) *Attorney, Agent, or Firm*—Ronald Reichman; Angelo N. Chaclas

(57) ABSTRACT

A method and system for electronically selling a data item such as a song, a literature piece or a picture. A data repository is used for a seller to store the data item that the seller wishes to sell for a fee. The data repository is accessible to a buyer who deposits a fund to the data repository prior to downloading the data item. Preferably, the data repository is connected to a telecommunication network such as the Internet so that the buyer can download the purchased data item directly through the telecommunication network. Preferably, the seller posts a price which is the maximum amount the seller wishes to collect and sets a minimum amount that the seller is willing to collect from the buyer for downloading the data item. Preferably, the buyer makes an offer to the data repository wherein a software program is used to check whether the offered price falls within the fee range as set by the seller.

21 Claims, 5 Drawing Sheets

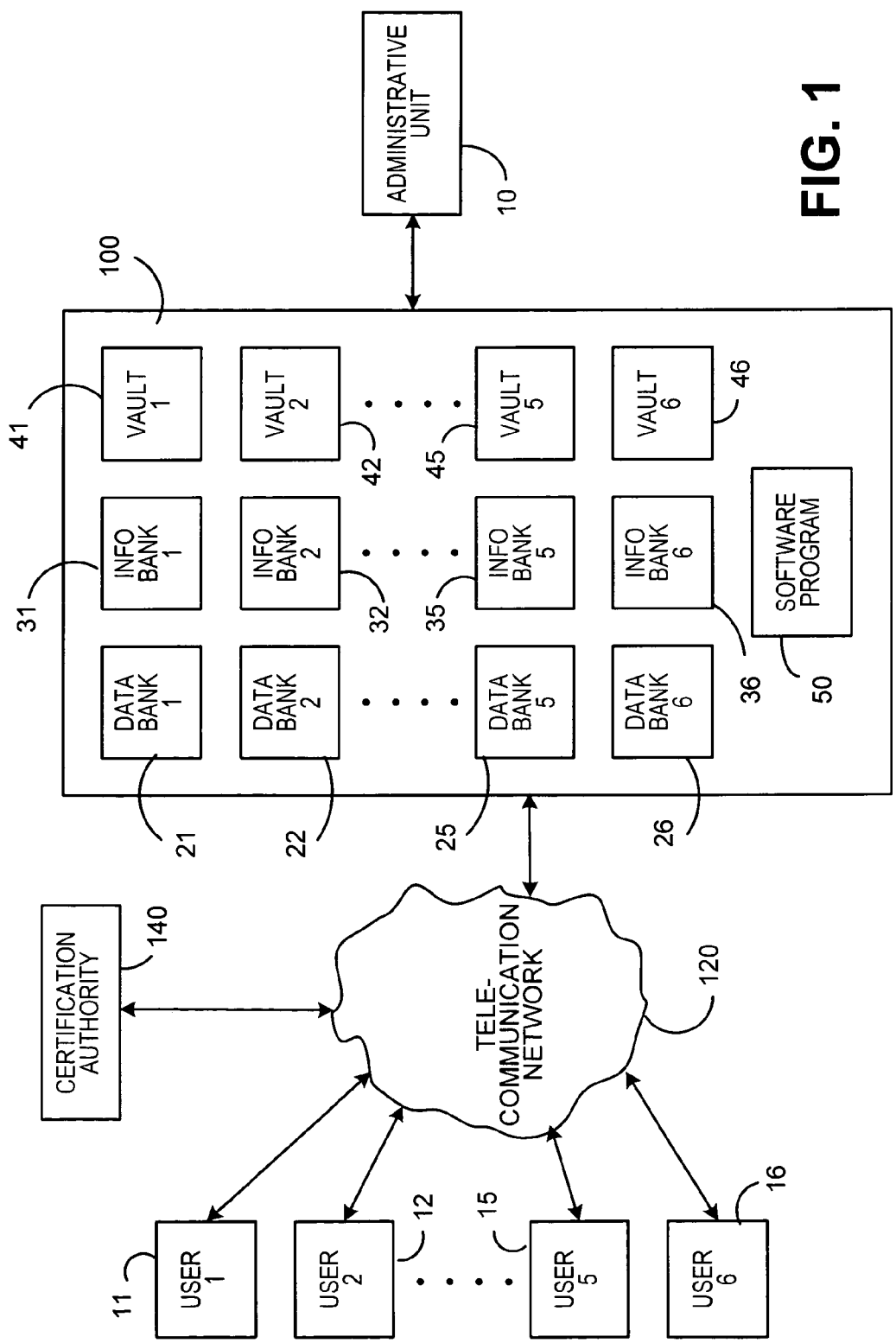

METHOD AND SYSTEM FOR DATA REPOSITORY

TECHNICAL FIELD

The present invention relates generally to a service provided to a seller in order to sell a data item electronically to a buyer for a fee and, more particularly, to a data repository system to allow the seller to store the data item therein and the buyer to directly download the data item therefrom.

BACKGROUND OF THE INVENTION

It is well-known that a data item such as a song, a piece of music, a document, a legal form, a book, a research report or a picture can be purchased through the Internet. Currently, there are two widely used methods for making such a transaction electronically.

One current method is for the seller to send the data item directly to the buyer via e-mail, wherein the price for buying the data item is negotiated between the two parties and the money is sent to the seller according to a paying method agreed upon. The major shortcoming of this method is that the seller must know the buyer or have faith in the buyer, hoping that the buyer will eventually pay for the data item. Furthermore, when the data item is sold to a large number of buyers, the seller must set up a system to keep track of which buyers have paid and which buyers have not yet paid. Many sellers may not have the temperament, the knowledge or the time to tend to the administrative aspect of doing business.

The other current method is for the seller to upload the data item to an Internet service provider or a Web site operator. The Internet service provider/Web site operator will then notify the buyer via e-mail with a unique universal resource locator (URL) so as to allow the buyer to download the data item through the URL. Musical works have been known to be purchased in this fashion wherein a buyer can download a song in an MP3 file to the buyer's computer. With this method, however, the buyer must provide a credit card number in order to be charged for downloading the data item. This is not advantageous to the Internet service provider/Neb site operator who provides the transaction service because credit card and bank fees are typically larger with high volume, low amount transactions.

It is advantageous and desirable to provide a method and system for providing a service to a seller who wishes to sell one or more data items electronically to one or more buyers without the above-described shortcomings.

SUMMARY OF THE INVENTION

The first aspect of the present invention is to provide a data repository system wherein a seller can electronically store a data item that the seller wishes to sell for a fee. The data repository system includes: a data storage, a monetary storage and an information storage, wherein the data storage is used for storing the data item so as to allow a buyer to download the data item directly therefrom; the information storage is used for the seller to post the fee for the buyer to pay for downloading the data item; and the monetary storage is used for the buyer to deposit a fund prior to downloading the data item, wherein a monetary sum is deducted from the deposited fund in order to pay for downloading the data item and the monetary sum is credited to the seller.

Preferably, the monetary storage includes an account for the seller so that the monetary sum credited to the seller can be stored in the seller's account.

Preferably, a user fee for using the data repository system is deducted from the seller's account.

Preferably, a commission fee for selling the data item is deducted from the seller's account.

Preferably, the seller provides an identification code to be stored in the information storage so as to allow the seller to access the seller's account and/or to modify the data item stored in the data storage.

Preferably, the buyer provides an identification code to be stored in the information storage so as to allow the buyer to use the deposited fund for downloading one or more data items if desired.

Preferably, an administrative unit is connected to the data repository system to monitor the transaction and notify a user of problems related to the use of the data repository system.

It is possible that the fee for downloading the data item has a range specified by the seller and defined by a maximum amount and a minimum amount wherein the maximum amount is the fee posted by the seller and a minimum amount is what the seller is willing to collect from the buyer for downloading the data item.

It is possible that the monetary sum for downloading the data item is negotiable.

It is possible that the monetary sum is proposed by the buyer and the buyer is allowed to download the data item if the proposed monetary sum is greater or equal to the minimum amount as specified by the seller, and preferably, a software program is used to automatically check the proposed monetary sum against the minimum amount.

The second aspect of the present invention is to provide a method of providing a service from a service provider so as to allow a seller to store in a data repository a data item that the seller wishes to sell for a fee, and allow a buyer to download the data item through a telecommunication network after paying a monetary sum. The method includes the steps of: storing the data item in the data repository; the buyer depositing a fund in the data repository; deducting a monetary sum from the fund deposited by the buyer; sending an electronic file containing the data item to the buyer; and crediting the monetary sum to the seller.

Preferably, the method further includes the steps of posting the fee by the seller and offering a price by the buyer.

Preferably, the data item is encrypted prior to being electronically conveyed to the buyer so as to prevent an unauthorized person from obtaining the downloaded data item by interception.

Preferably, the method further includes the step of providing a digital signature to the buyer so as to allow the buyer to verify the authenticity of the downloaded data item through a Certification Authority.

Preferably, a user fee is deducted from the monetary sum credited to the seller.

It is possible that the user fee includes an amount for using the data repository service.

It is possible that the user fee includes a commission for selling the data item.

It is possible that the method further includes the step of providing an excerpt of the data item so to allow the buyer to review the data item without the possibility of substantially downloading the data item without paying.

The present invention will become apparent upon reading the description taken in conjunction with FIGS. 1 to 7.

BRIEF DESCRIPTION OF THE DRAWINGS

FIG. 1 is a block diagram showing the components of the data repository system, according to the present invention.

DETAILED DESCRIPTION

Figure 3:
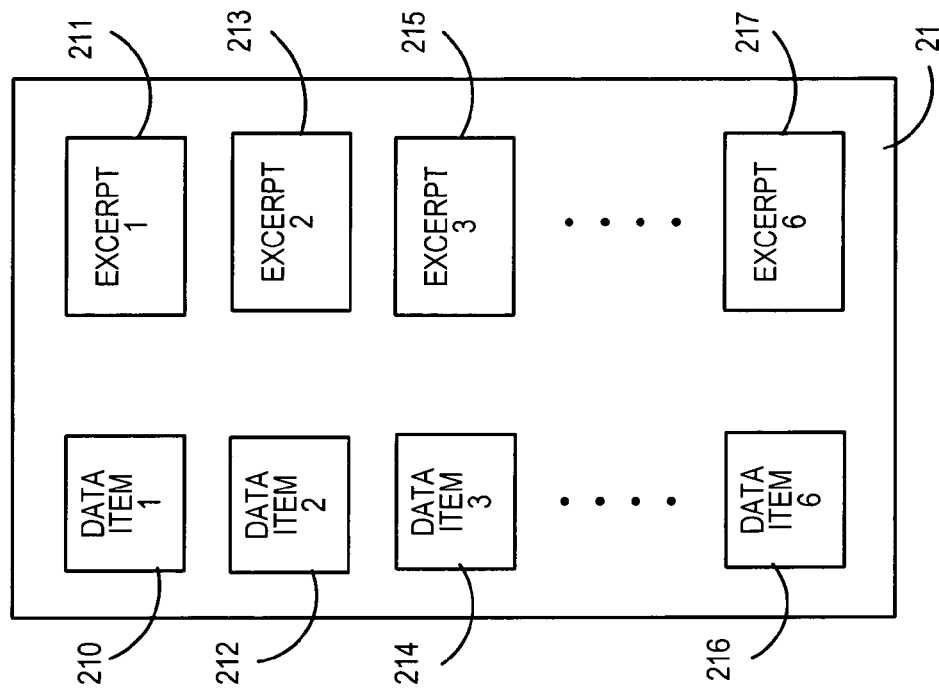
FIG. 3 is a block diagram showing the contents in a data storage within the data repository system.

As shown in FIG. 1, the data repository system 100 includes a plurality of data banks (21–26), a plurality of information banks (31–36), a plurality of electronic vaults (41–46), and a software program 50. The data repository system 100 allows access by a plurality of users (1–6). Also shown in FIG. 1 is an administrative unit 10 that manages the data repository system 100. It is understood that the data bank 21, the information bank 31 and the vault 41 are associated with the user 11, for example. The data bank can be used by the user 11 to store one or more data items that the user 11 wishes to sell electronically for a fee. However, the data bank 21 can also be used for the user 11 to download a data item from other data banks (22–26) if the user 11 pays a fee for downloading the data item. Thus, any user can be a seller or a buyer or both. Accordingly, the vault 41 can be used for storing proceeds from selling a data item that are credited to the seller, but it can also be used for depositing a fund so as to allow a buyer to use part or all of the fund to pay for downloading one or more data items.

Preferably, the data repository system 100 is connected to a telecommunication network 120, such as the Internet, so as to allow the users (11–16) to access the data repository system 100 through the telecommunication network 120. Preferably, a Certification Authority 140 is also connected through the telecommunication network 120 so as to allow the buyer to verify the authenticity of the downloaded data items. Preferably, the Certification Authority 140 is provided by a third party who is independent of the users (11–16) and the data repository system 100.

Preferably, the software program 50 has an encryption function to encrypt a data item prior to said data item being conveyed to the buyer through the telecommunication network 120. The encryption is used to prevent the conveyed data item being intercepted by an unauthorized person who may use the data item without paying a fee to the seller.

In order for a buyer to download a data item, the buyer must deposit a fund which must be sufficient to pay for downloading the data item. The fund can be a monetary sum deposited to a bank designated by the service provider of the data repository, or a bank account provided by the buyer where money can be withdrawn for paying the data item. The fund can also be in the form of a debit card, a smartcard or a stored-value card.

Figure 2:
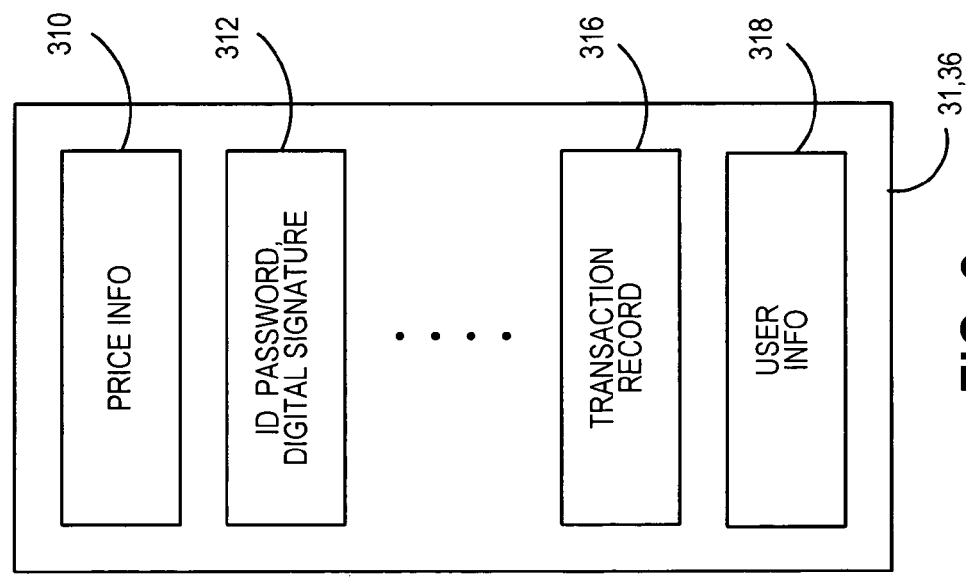
FIG. 2 is a block diagram showing the components of an information storage within the data repository system.

FIG. 2 is the components in an information bank (31–36). As shown, the information bank (31–36) may include a price information storage area 310, an identification code storage area 312, a transaction record 316, and a user information storage area 318. The price information storage area 310 can be used for a seller to post a fee for selling a data item, or for a buyer to make an offer for downloading the data item. It is possible that the fee stored in the price information storage area 310 has a range specified by the seller and defined by a maximum amount and a minimum amount wherein the maximum amount is an asking price that the seller posts for selling the data item and a minimum amount is what the seller is willing to accept for selling the data item. When a buyer makes an offer, the offered price is automatically checked against the seller-specified minimum amount by the software program 50. If the offered price by the buyer is equal to or greater than the minimum amount, then the buyer is allowed to download the data item after a monetary sum equal to the offered price is deducted from the fund stored in the buyer's vault (41–46).

The transaction record 316 may contain the number of transactions regarding the selling of one or more data items electronically and each transaction may have a different fee.

The user information storage area 318 may contain the name, address, phone number, fax number, and e-mail address of a user so that the user can be notified by the service provider of problems regarding the transaction or a change in the user fee, for example.

The identification code storage area 312 is used to store a unique code, such as a password, provided by or assigned to a user in order for the user to access the data bank, the information bank or the vault associated with the user. For example, a seller may use his/her password to access the associated data bank to modify the data item, to access the transaction record to review the statistics, or to access the vault to check on the accumulated proceeds or to transfer the money out of the vault. Preferably, a digital signature of the seller is also stored in the identification code storage area 312 so that the digital signature can be provided to the buyer when the buyer downloads the data item. With the digital signature, the buyer can verify the authenticity of the downloaded data item. Similarly, a buyer may use his/her password to access the associated vault to check the balance.

FIG. 3 shows an exemplary data bank. As shown, a data bank 21 may include a plurality of data items 210–216 that a seller wants to sell through electronic transactions. It is possible that each data item 210–216 has an excerpt 211–217 so as to allow a buyer to review the data item without the possibility of downloading the data item in its entirety without paying the seller. For example, if a data item is a song or a piece of music, the excerpt can be a sample passage or clipping of one or two minutes long. The excerpt can be accessed anytime by a potential buyer, or it can be repeatedly or occasionally exposed on the Internet.

Figure 4:
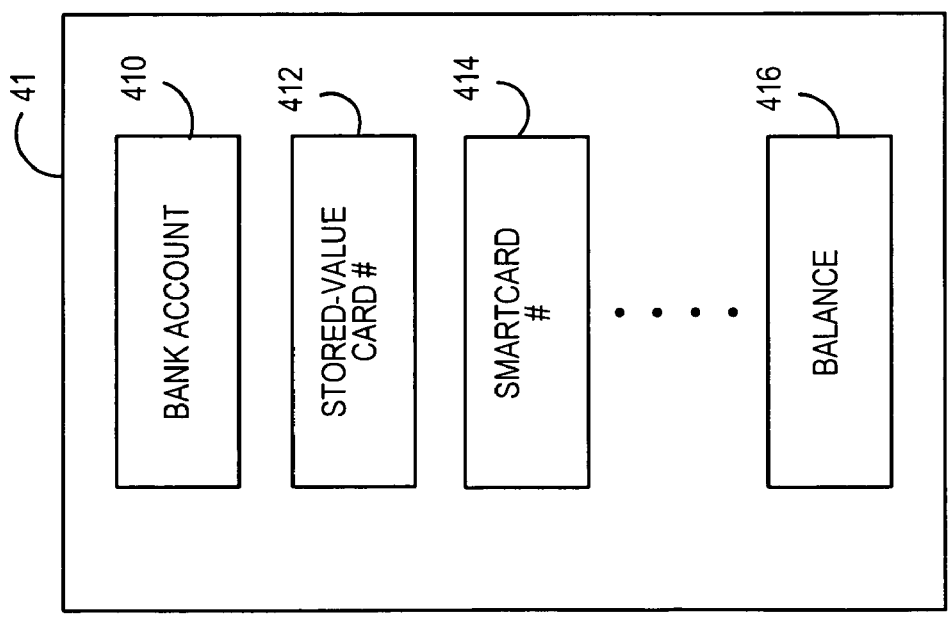
FIG. 4 is a block diagram showing the contents in an electronic vault within the data repository system.

FIG. 4 shows the components of an electronic vault. As shown, the vault 41 may contains a bank account 410, a stored-value card number 412, a smartcard number 414, and a balance amount 416. If the user 11 who is associated with the vault 41 is a buyer, then the bank account 410 identifies an account where money can be withdrawn to pay for the data item prior to the buyer being allowed to download the data item. Alternately, money can be withdrawn for the stored-value card 412. It is also possible that the service provider of the data repository 100 designates a bank account for the buyer to deposit a fund which is sufficient to pay for the data item the buyer wishes to download. The balance amount 416 reflects the monetary amount currently left from the fund deposited by the buyer.

If the user 11 who is associated with the vault 41 is a seller, then the bank account 410 identifies an account where the proceeds may be transferred to in order to pay the seller. It is possible that the service provider of the data repository designates a bank account to the seller so that all the proceeds credited to the seller can be automatically transferred to that bank account. Preferably, a user fee is deducted from the proceeds to pay the service provider of the data repository system 100.

Figure 5:
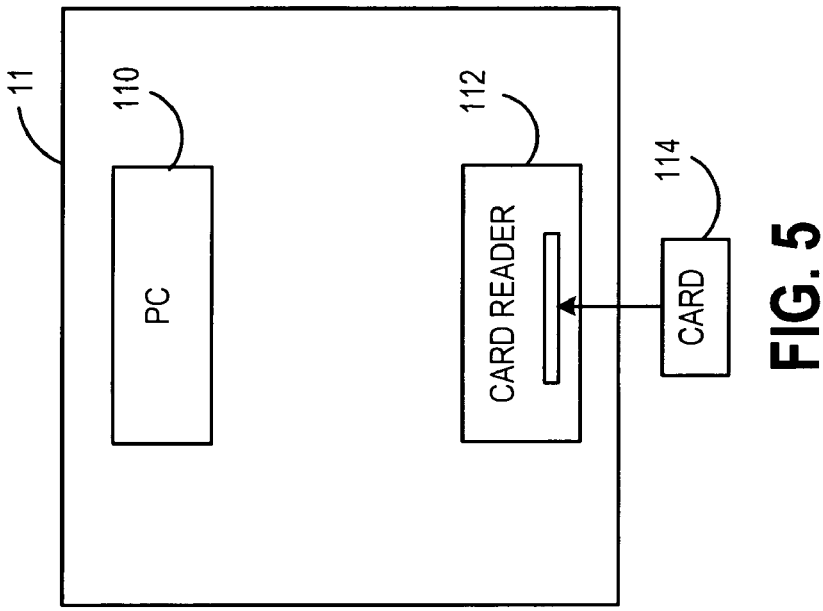
FIG. 5 is a block diagram showing the input/output components which are used by a user to communicate with the data repository.

FIG. 5 shows the input/output devices for a user to access the telecommunication network 120 in order to make a transaction. For example, the user 11 may use a personal computer 110 to upload or download a data item to or from the data repository system 100, and a stored-value card reader 112 in order to withdraw money from the stored-value card 114 for a buyer to pay for downloading a data item or for a seller to store the money withdrawn from the vault 41.

Figure 6:
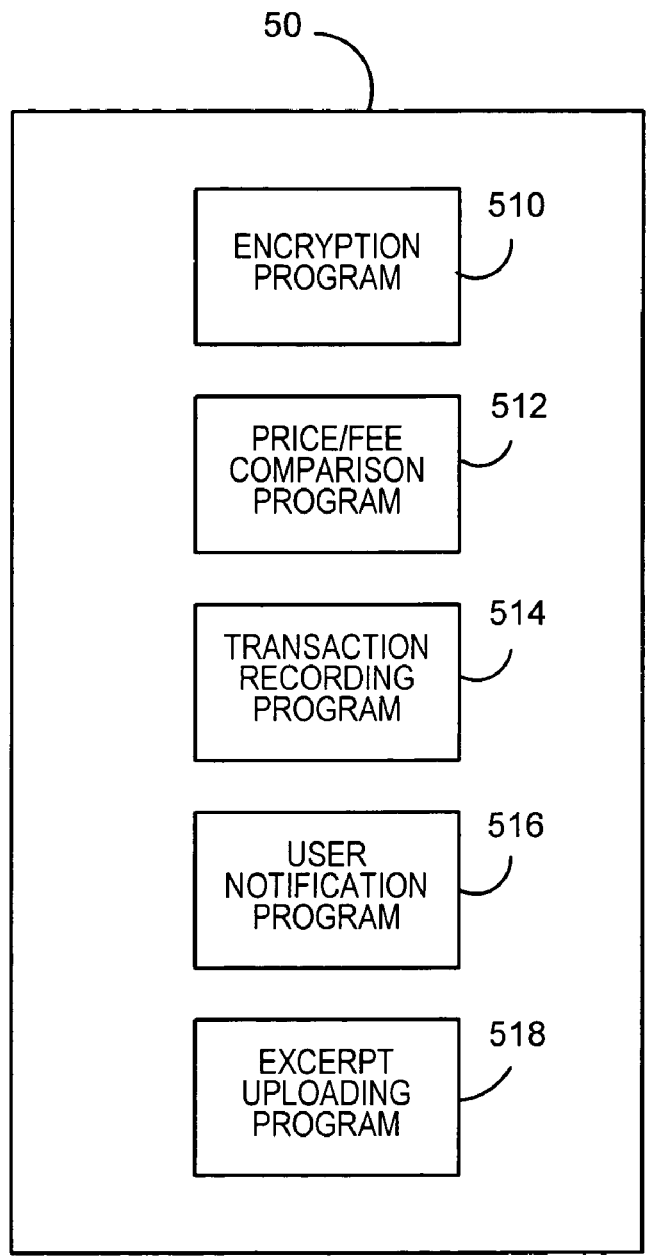
FIG. 6 is a block diagram showing the components in the software program within the data repository system.

FIG. 6 shows the components in the software program 50. As shown, the software program 50 may include an encryption function 510, a price/fee comparison program 512, a transaction recording program 514, a user notification program 516 and an excerpt uploading program 518. The encryption function 510 is used for encrypting a data item 210–216 prior to sending the data item 210–216 through the telecommunication network 120. The price/fee comparison program 512 is used to determine whether the price offered by a buyer falls within the fee range specified by the seller. The transaction recording program 514 is used to keep track of the selling and buying of various data items and summarized in the transaction record 316 of the information storage 31, for example. The user notification program 516 can be used to notify a buyer if the price offered by the buyer is lower than the minimum amount specified by the seller. The excerpt uploading program 518 is used to provide a potential buyer a sample passage of the data item specified by the potential buyer.

Figure 7:
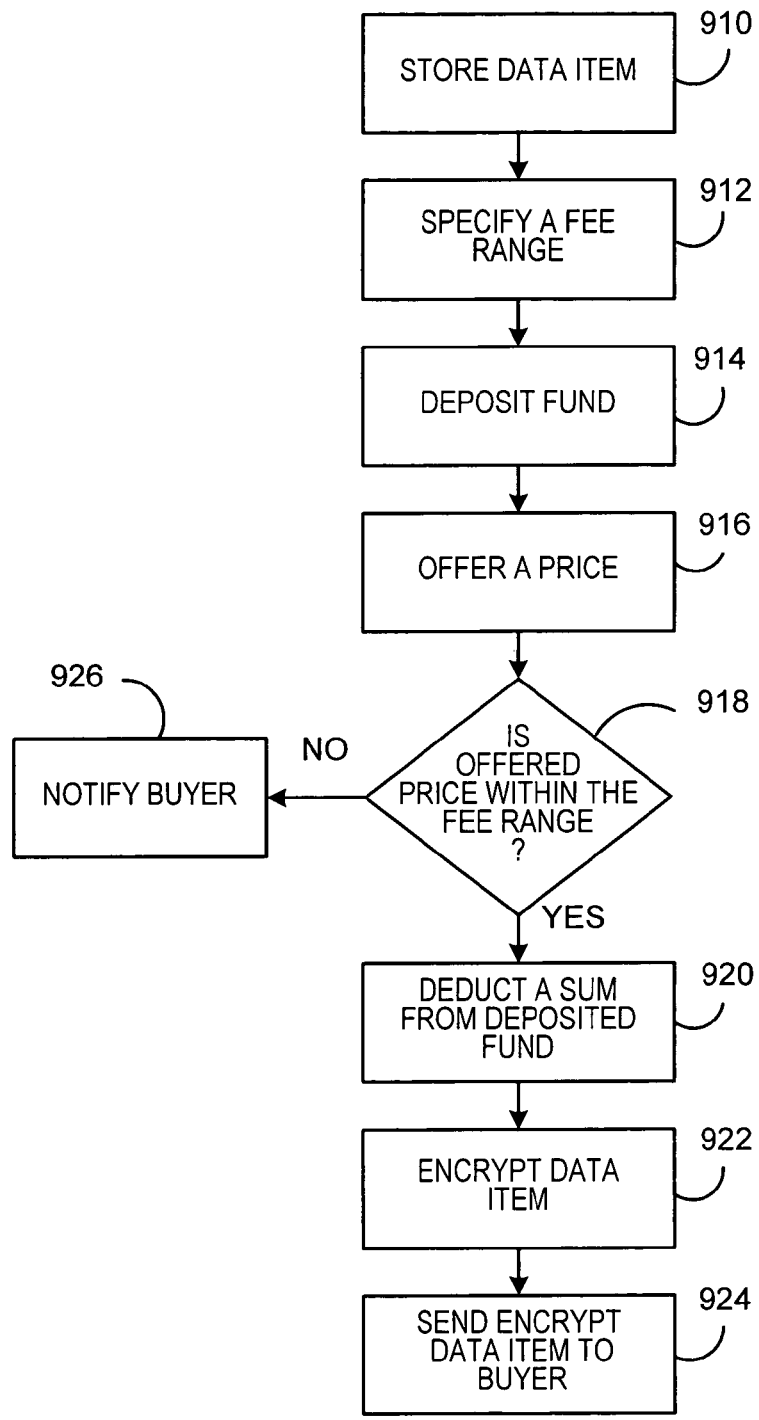
FIG. 7 is a flow chart illustrating the steps in making an electronic transaction regarding downloading a data item from the data repository for a fee.

FIG. 7 shows the steps in making a transaction through a telecommunication network 120 regarding the selling of a data item electronically by a seller to a buyer for a fee. As shown, the seller stores in the data repository the data item that the seller wishes to sell at step 910. The seller may provide to the data repository a fee range specified by the seller and defined by a maximum amount and a minimum amount, at step 912. Alternatively, the seller may simply post a firm fee. At step 914, the buyer deposits a fund into a vault 41–46 in the data repository 100. At step 916, the buyer makes an offer to pay for downloading the data item. At step 918, the software program 50 in the data repository system 100 determines whether the price offered by the seller falls within the fee range. If the offered price is equal to or greater than the minimum amount, then a monetary sum equal to the offered price is deducted from the fund at step 920. The data item is encrypted at step 922, and sent to the buyer at step 924. However, if the price offered by the buyer at step 916 is less than the minimum amount specified by the seller, then the buyer is notified of the fact that no transaction is made, at step 926.

Thus, what has been described is a method and a system for providing a service to a seller who wishes to electronically sell a data item to one or more buyers for a fee through a telecommunication network. A data repository is provided for the seller to store the data item and for the buyer to directly download the data item onto the buyer's input device. Prior to making such a transaction, the buyer is required to deposit a fund into a monetary storage in the data repository. The fee that the buyer pays for downloading the data item is automatically deducted from the deposited fund and credited to the seller. For using the service, the seller must pay a user fee to the data repository service provider.

Although the invention has been described with respect to a preferred version thereof, it will be understood by those skilled in the art that the foregoing and various other changes, omissions and deviations in the form and detail thereof may be made without departing from the spirit and scope of this invention.

What is claimed is:

1. A data repository system to allow a seller to store a data item that the seller wishes to sell electronically to a buyer for a fee, said repository system comprising:
   a) a data storage;
   b) an information storage; and
   c) a monetary storage having a seller's account and a buyer's account, wherein
      (i) the data storage is used to store the data item; and
      (ii) the information storage is for posting the fee for downloading the data item from the data storage, and the buyer deposits the fund in the monetary storage prior to downloading the data item; wherein said data repository system further comprises a program capable of communicating with the data storage, the information storage and the monetary storage so as to store a fund deposited by the buyer to pay for downloading the data item into the buyer's account;
      (iii) to allow the buyer to download a portion of the data item so that the buyer may review the data item without the possibility of downloading the data item in its entirety without paying the seller;
   (iv) to deduct a monetary sum from the deposited fund according the posted fee in the information storage;
   (v) to allow the buyer to download the data item from the data storage;
   (vi) to credit the monetary sum to the seller's account, wherein the fee for downloading the data item has a range specified by the Seller and defined by a maximum amount, and a minimum amount wherein the maximum amount is the fee posted by the Seller, and a minimum amount is what the Seller is willing to collect from the buyer for downloading the data item so that the buyer is allowed to download the data item if the buyer's proposed monetary sum for downloading the data item is greater or equal to the minimum amount specified by the seller and after the buyer's proposed monetary sum is deducted from the buyer's account and credited to the seller's account
   (vii) to encrypt the data item prior to downloading the data item to the buyer to prevent an unauthorized person from obtaining the downloaded data item by interception; and
   (viii) to provide a digital signature to the buyer to allow the buyer to verify the authenticity of the downloaded data item through a certification authority.

2. The data repository system of claim 1, wherein the fee deducted from the fund deposited by the buyer is credited to the seller.

3. The data repository system of claim 2, wherein the seller pays a user fee for using the data repository and the user fee is deducted from the fee credited to the seller.

4. The data repository system of claim 2, wherein the seller pays a commission for selling the item to the buyer and the commission is deducted from the fee credited to the seller.

5. The data repository system of claim 2, wherein the monetary storage includes an account for the seller to store the fee credited to the seller.

6. The data repository system of claim 5, wherein the seller uses an identification code to access the seller's account.

7. The data repository system of claim 1, further comprising a software program to automatically check the offered price by the buyer in order to determine whether the posted offer falls within the fee range as specified by the seller.

8. The data repository system of claim 1, wherein the seller uses an identification code to modify the data item and/or the fee.

9. The data repository system of claim 1, wherein the data storage further stores an excerpt of the data item so as to allow the buyer to review the data item without the possibility of downloading the data item without paying the seller.

10. The data repository system of claim 1, further comprising an administrative unit for notifying a user of the data repository system of problems related to the use of the data repository system.

11. The data repository system of claim 1, wherein the data storage includes a plurality of data banks each of which is used to store a data item and an excerpt of said data item.

12. The data repository system of claim 1, wherein the fund is deposited in a bank and the deposited fund can be withdrawn by the data repository system to pay for downloading the data item.

13. The data repository system of claim 1, wherein the fund is stored in a stored-value card and the stored fund can be withdrawn by the data repository system to pay for downloading the data item.

14. The data repository system of claim 1, wherein the data item is encrypted prior to the buyer downloading the data item.

15. A method of providing a service by a service provider to allow a seller to electronically sell a data item for a fee to a buyer who downloads the data item through a telecommunication network said method comprising the steps of:
   a) storing the data item in a data repository;
   b) depositing a fund in the data repository;
   c) downloading a portion of the data item so that the buyer may review a portion of the data item without the possibility of downloading the entire data item without paying the seller;
   d) downloading the data item from the repository;
   e) deducting a monetary sum from the fund and crediting the deducted sum to the seller, wherein the fee for downloading the data item in its entirety has a range specified by the Seller and defined by a maximum amount, and a minimum amount wherein the maximum amount is the fee posted by the Seller, and a minimum amount is what the Seller is willing to collect from the buyer for downloading the data item so that the buyer is allowed to download the data item if the buyer's proposed monetary sum for downloading the data item is greater or equal to the minimum amount specified by the seller
   f) encrypting the data item prior to downloading the data item to the buyer to prevent an unauthorized person from obtaining the downloaded data item by interception; and
   g) providing a digital signature to the buyer to allow the buyer to verify the authenticity of the downloaded data item through a certification authority.

16. The method of claim 15, wherein the monetary sum is equal to a price offered by the buyer to pay for downloading the data item, said method further comprising the steps of:
   (a) comparing the offered price in order to determine whether the offered price falls within the fee range as specified by the seller.

17. The method of claim 16, wherein an excerpt of the data item is used for the buyer to review the data item before downloading the data item, said method further comprising the step of downloading an electronic file containing the excerpt to the buyer.

18. The method of claim 15, wherein the fund is deposited in a bank and wherein the deposited fund can be withdrawn into the data repository in order to pay the seller.

19. The method of claim 15, wherein the fund is stored in a stored-value card and wherein the stored fund can be withdrawn into the data repository in order to pay the seller.

20. The method of claim 15 further comprising the step of providing a digital signature when the data item is downloaded from the data repository so as to allow the buyer to verify the authenticity of the downloaded data item.

21. The method of claim 20, wherein the authenticity of the downloaded data item is verified through a Certification Authority.

* * * * *